(12) United States Patent
Peeples et al.

(10) Patent No.: US 12,283,983 B2
(45) Date of Patent: Apr. 22, 2025

(54) BOTTLE OPENING PHONE CASE DEVICE

(71) Applicants: Terry Peeples, Vaiden, MS (US);
Mercedes Peeples, Vaiden, MS (US)

(72) Inventors: Terry Peeples, Vaiden, MS (US);
Mercedes Peeples, Vaiden, MS (US)

( * ) Notice: Subject to any disclaimer, the term of this patent is extended or adjusted under 35 U.S.C. 154(b) by 352 days.

(21) Appl. No.: 17/949,051

(22) Filed: Sep. 20, 2022

(65) Prior Publication Data
US 2024/0097731 A1    Mar. 21, 2024

(51) Int. Cl.
*H04M 1/18* (2006.01)
*B67B 7/04* (2006.01)
*B67B 7/16* (2006.01)
*H04B 1/3888* (2015.01)

(52) U.S. Cl.
CPC .......... *H04B 1/3888* (2013.01); *B67B 7/0411* (2013.01); *B67B 7/16* (2013.01)

(58) Field of Classification Search
CPC ........ H04B 1/3888; B67B 7/0411; B67B 7/16
USPC ...................................... 455/575.8
See application file for complete search history.

(56) References Cited

U.S. PATENT DOCUMENTS

| 8,483,786 B2 | 7/2013 | Ramies | |
|---|---|---|---|
| 2006/0146483 A1 | 7/2006 | Patino | |
| 2011/0233078 A1 | 9/2011 | Monaco | |
| 2011/0253569 A1* | 10/2011 | Lord | H04M 1/21 |
| | | | 206/320 |
| 2018/0332155 A1* | 11/2018 | Babbage, III | H04M 1/04 |
| 2019/0357651 A1* | 11/2019 | Adrain | A45C 15/00 |
| 2024/0097731 A1* | 3/2024 | Peeples | H04B 1/3888 |

OTHER PUBLICATIONS

IP.com (Year: 2024).*
ProQuest (Dialog) (Year: 2024).*

* cited by examiner

*Primary Examiner* — Moustapha Diaby

(57) ABSTRACT

A bottle opening phone case device capable of opening capped and corked bottles includes a shell, which defines an interior space and which has a front that is open. A phone is insertable into the shell to couple the shell to the phone. A plurality of apertures is positioned in the shell, with each aperture aligning with an associated operative element of the phone. A corked bottle opener, which is hingedly attached to the shell, is selectively positionable in a stowed configuration and a deployed configuration. In the stowed configuration, the corked bottle opener substantially abuts the shell. In the deployed configuration, the corked bottle opener is substantially perpendicular to the shell. With the shell grasped in a hand of a user, the user is positioned to use the corked bottle opener to remove a cork from a corked bottle.

15 Claims, 7 Drawing Sheets

BOTTLE OPENING PHONE CASE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to phone cases and more particularly pertains to a new phone case having integrated tools. The present invention discloses a phone case that is capable of opening corked bottles as well as capped bottles.

(2) Description of Related Art Including Information Disclosed Under 37 CFR 1.97 and 1.98

The prior art relates to phone cases. Prior art phone cases may comprise capped bottle openers. However, the prior art does not teach a phone case comprising a corked bottle opener, nor does the prior art teach a phone case having a capped bottle opener in combination with a corked bottle opener.

BRIEF SUMMARY OF THE INVENTION

An embodiment of the disclosure meets the needs presented above by generally comprising a shell, which defines an interior space and which has a front that is open. The shell is configured for insertion of a phone to couple the phone to the shell. A plurality of apertures is positioned in the shell, with each aperture aligning with an associated operative element of the phone. A corked bottle opener, which is hingedly attached to the shell, is selectively positionable in a stowed configuration and a deployed configuration. In the stowed configuration, the corked bottle opener substantially abuts the shell. In the deployed configuration, the corked bottle opener is substantially perpendicular to the shell. The shell is configured to be grasped in a hand of a user, positioning the user to use the corked bottle opener to remove a cork from a corked bottle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
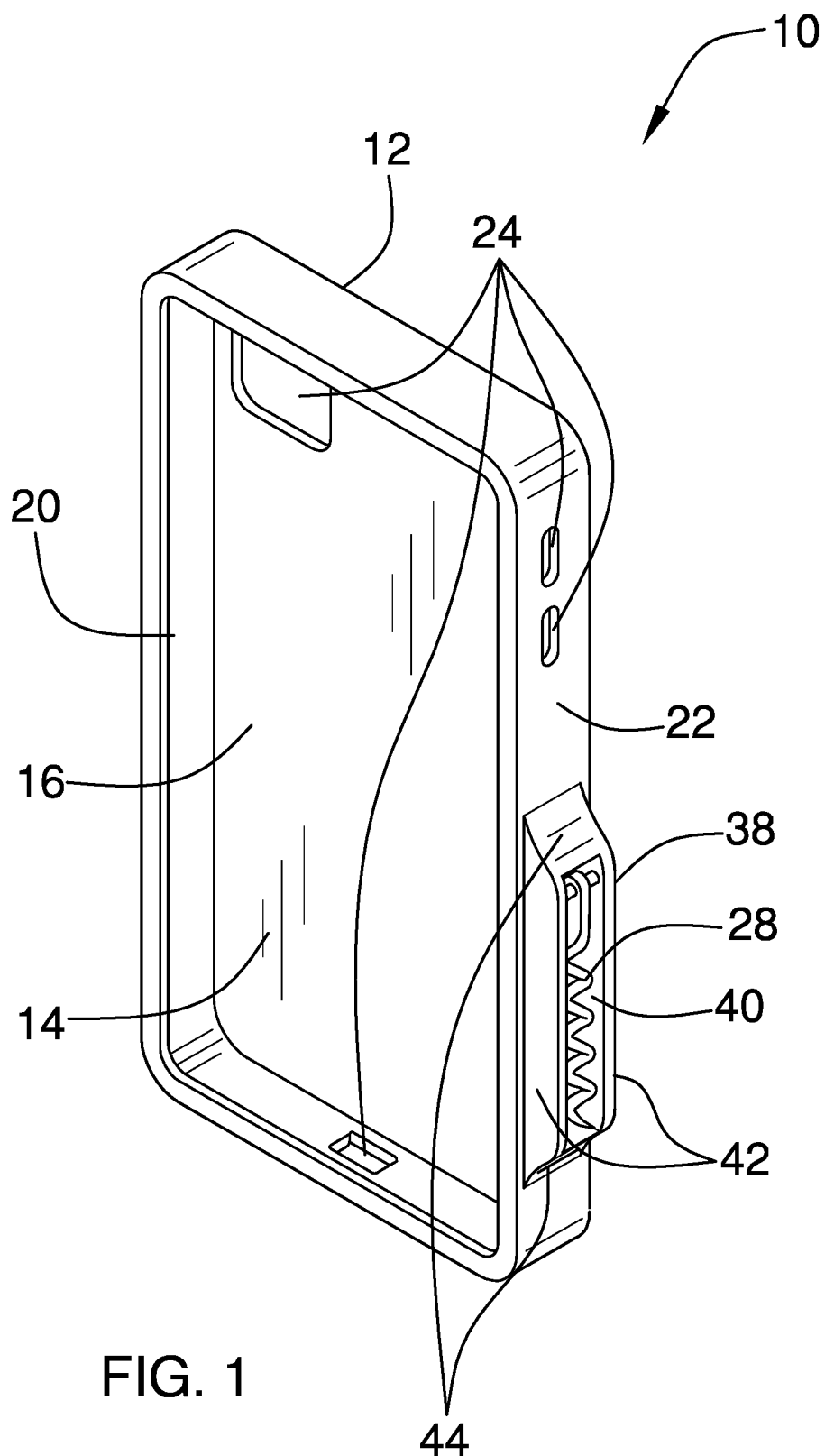
FIG. 1 is a front isometric perspective view of a bottle opening phone case device according to an embodiment of the disclosure.

With reference now to the drawings, and in particular to FIGS. 1 through 8 thereof, a new phone case embodying the principles and concepts of an embodiment of the disclosure and generally designated by the reference numeral 10 will be described.

As best illustrated in FIGS. 1 through 8, the bottle opening phone case device 10 generally comprises a shell 12, which defines an interior space 14 and which has a front 16 that is open. The shell 12 is configured for insertion of a phone 18 to couple the phone 18 to the shell 12. At least a portion 20 of a sidewall 22 of the shell 12 may comprise silicone, rubber, elastomer, or the like, and thus be resiliently deformable. The sidewall 22 thus is configured to be deformed to facilitate insertion of the phone 18 into the interior space 14 and attachment of the shell 12 to the phone 18. The present invention also anticipates the shell 12 be alternatively configured, as is known to those skilled in the art of phone encasement. For example, two piece phone cases are anticipated by the present invention.

Figures 4, 5:
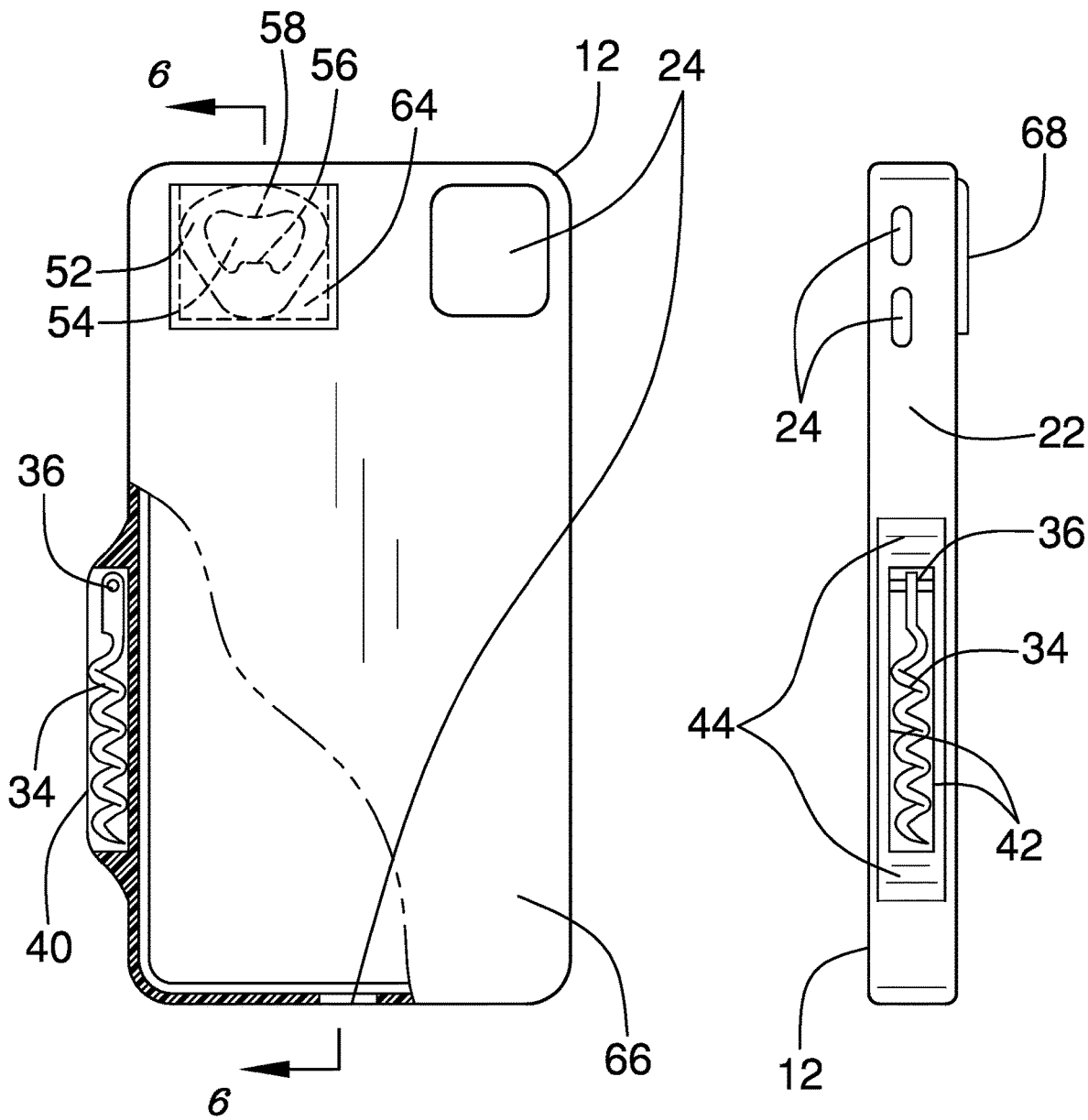
FIG. 4 is a rear view of an embodiment of the disclosure.
FIG. 5 is a side view of an embodiment of the disclosure.
Figure 6:
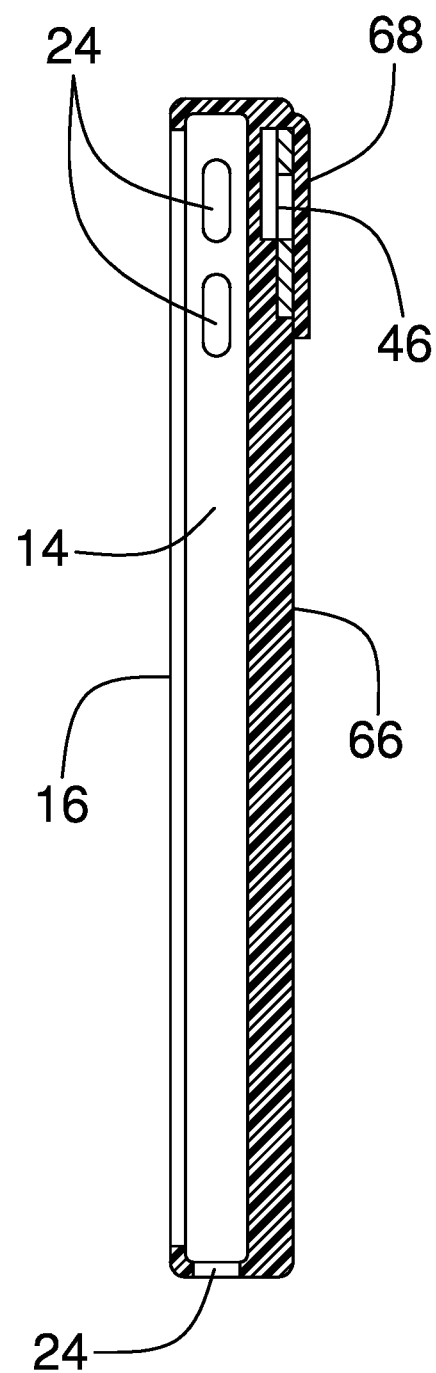
FIG. 6 is a cross-sectional view of an embodiment of the disclosure.
Figure 7:
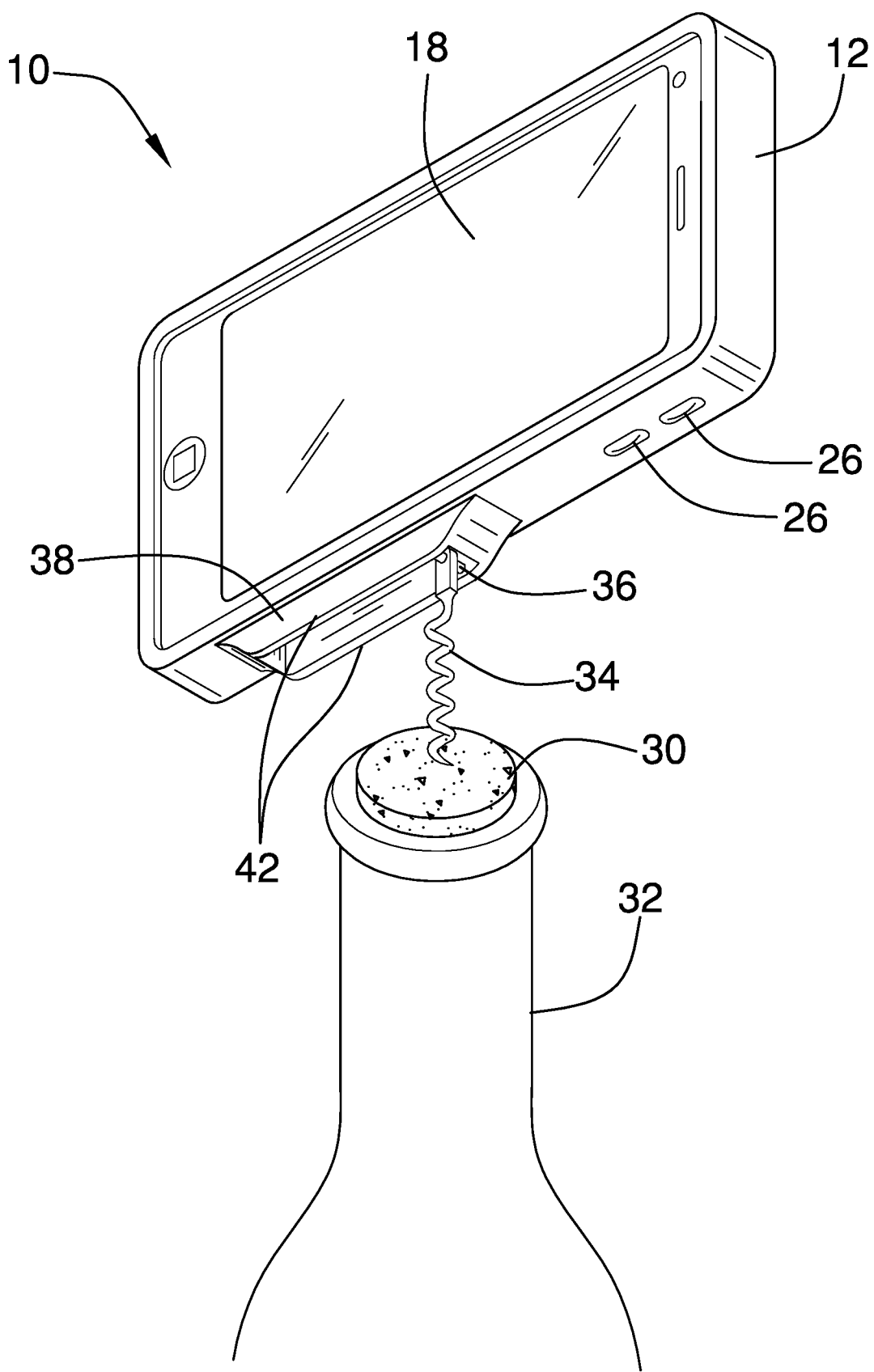
FIG. 7 is an in-use view of an embodiment of the disclosure.
Figure 8:
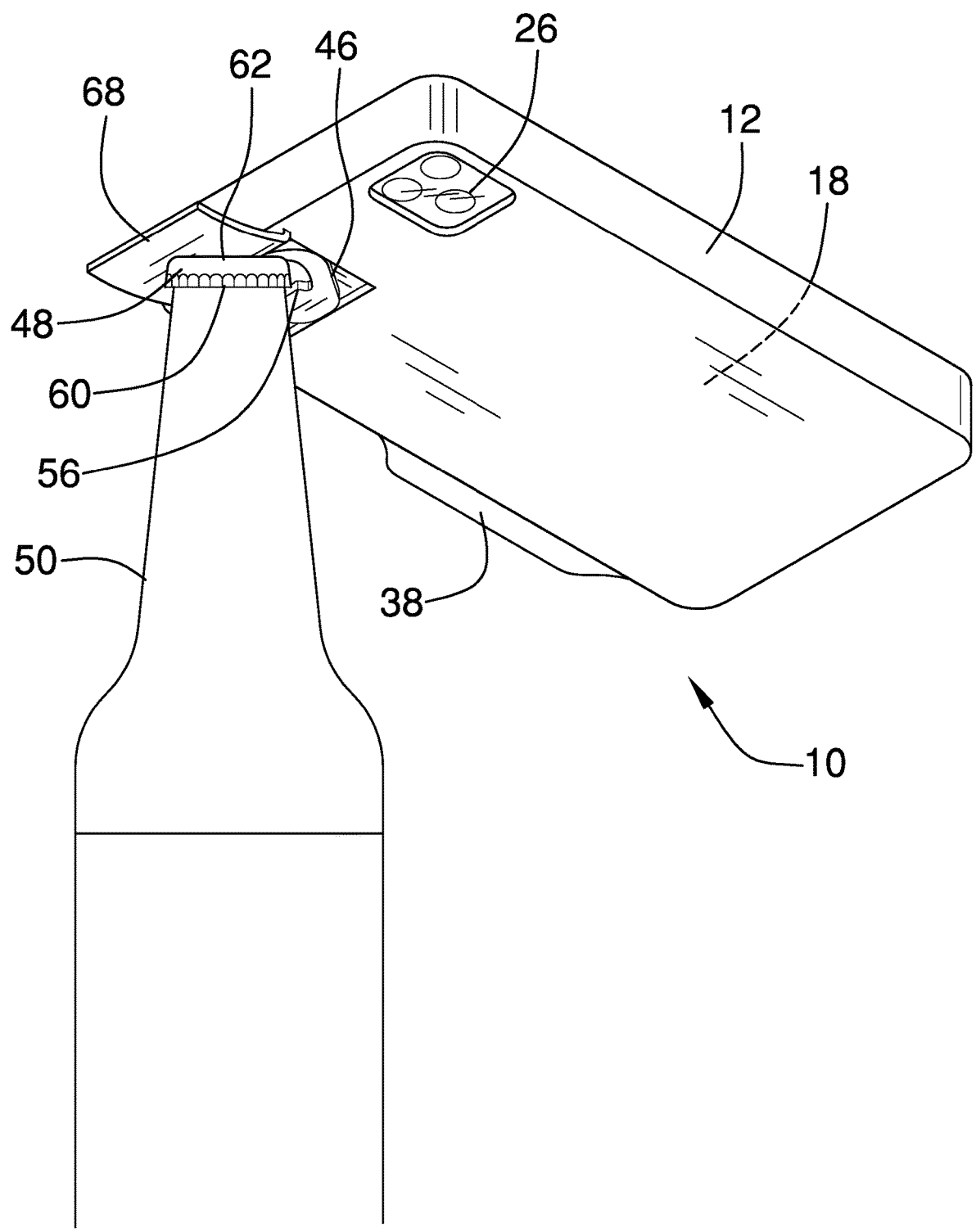
FIG. 8 is an in-use view of an embodiment of the disclosure.

A plurality of apertures 24 is positioned in the shell 12, with each aperture 24 aligning with an associated operative element 26 of the phone 18. A corked bottle opener 28, which is hingedly attached to the shell 12, is selectively positionable in a stowed configuration and a deployed configuration. In the stowed configuration, as shown in FIG. 4, the corked bottle opener 28 substantially abuts the shell 12. In the deployed configuration, as shown in FIG. 7, the corked bottle opener 28 is substantially perpendicular to the shell 12. The shell 12 is configured to be grasped in a hand of a user, positioning the user to use the corked bottle opener 28 to remove a cork 30 from a corked bottle 32.

As shown in FIG. 1, the corked bottle opener 28 comprises a corkscrew 34, which is hingedly attached by its first end 36 to the shell 12. The corkscrew 34 is configured to be screwed into the cork 30 of the corked bottle 32, as shown in FIG. 7, positioning a user to pull the cork 30 from the corked bottle 32. The present invention also anticipates the corked bottle opener 28 comprising a twin prong cork puller (not shown).

Figure 2:
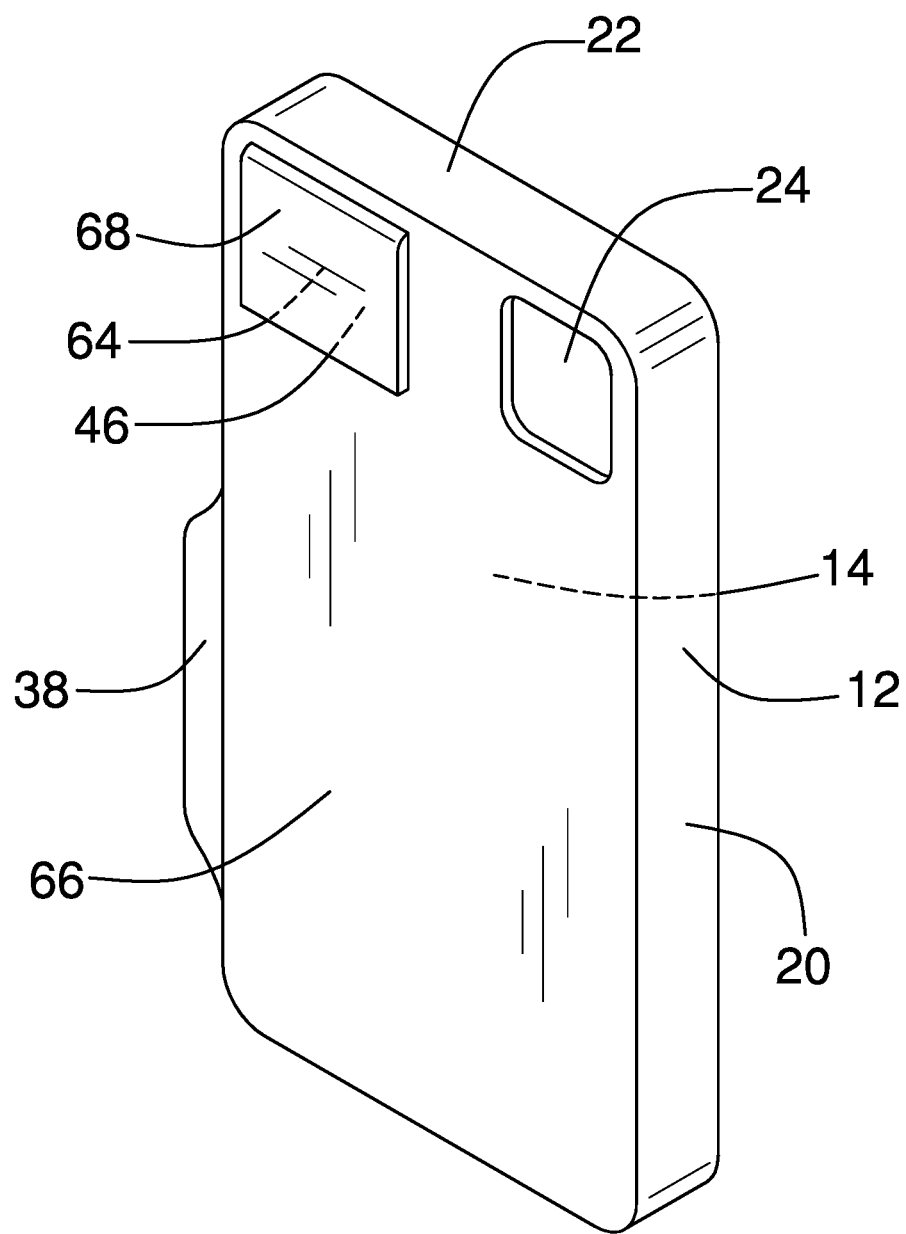
FIG. 2 is a rear isometric perspective view of an embodiment of the disclosure.

The shell 12 comprises a housing 38, which is attached to the sidewall 22 and which has an open top 40. The first end 36 of the corkscrew 34 is rotationally attached to and extends between opposed sides 42 of the housing 38, proximate to a respective opposed end 44 of the housing 38. The corkscrew 34 is substantially nested within the housing 38, when in the stowed configuration, and is hingable from the housing 38 to the deployed configuration. As shown in FIG. 2, the opposed ends 44 taper from the open top 40 to the sidewall 22, which facilitates insertion of the shell 12 into a pocket. The present invention also anticipates a lid (not shown), which is attached to the housing 38 and which is positioned to selectively close the open top 40.

Figure 3:
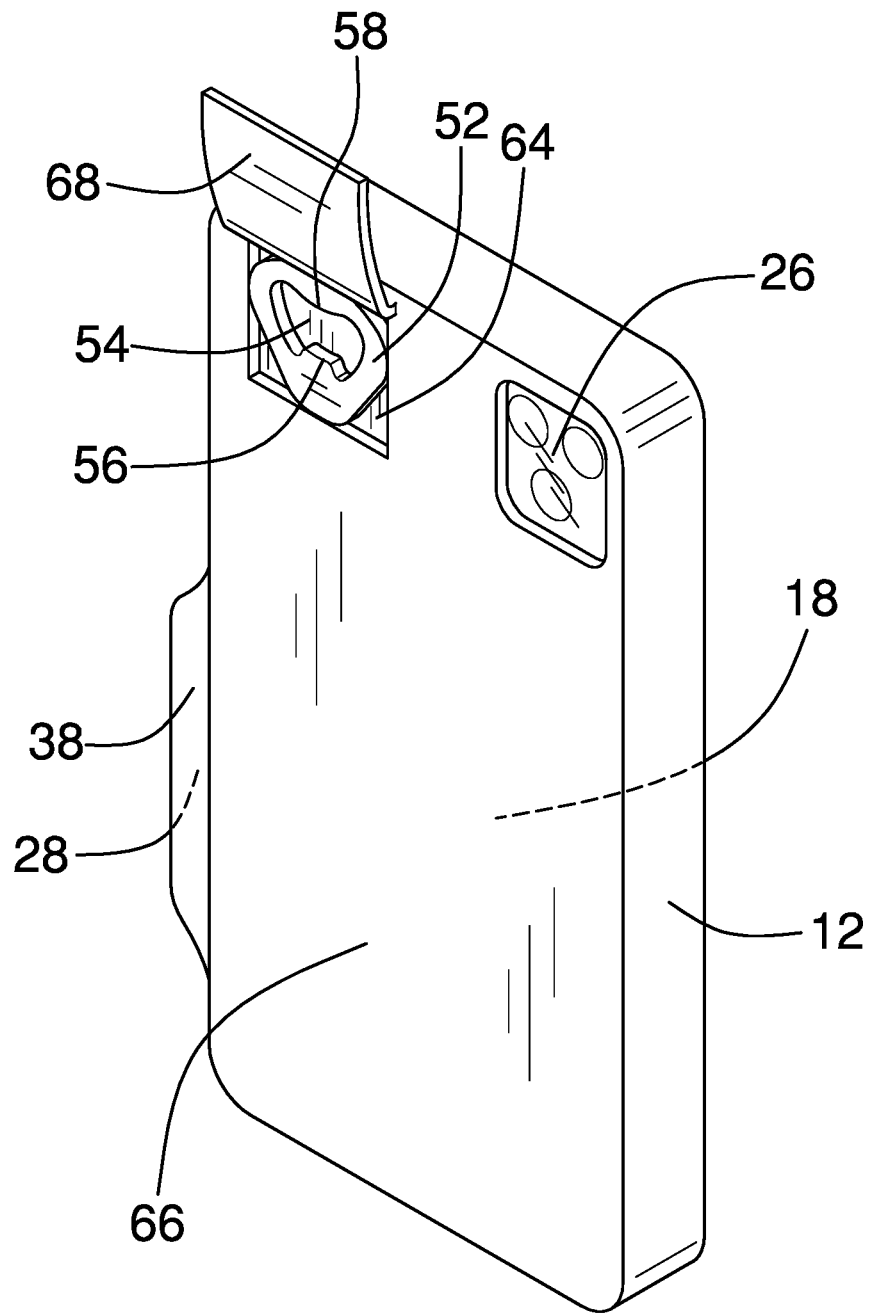
FIG. 3 is a rear isometric perspective view of an embodiment of the disclosure.

As shown in FIG. 3, a capped bottle opener 46 is attached to the shell 12. The shell 12 is configured to be grasped in a hand of a user, positioning the user to engage the capped bottle opener 46 to a cap 48 on a capped bottle 50 and to lever the shell 12 to remove the cap 48 from the capped bottle 50.

The present invention is intended to alleviate situations wherein a user has need to open a corked bottle 32 or a capped bottle 50. Often in these situation, a bottle opener is not available, and the user will resort to unsafe methods for opening the corked bottle 32 or the capped bottle 50, which can result in broken bottles and injury. As the user is almost certain to have their phone 18 in their possession, the bottle opening phone case device 10 provides a solution to opening corked bottles 32 and capped bottles 50, thus alleviating potentially dangerous, and certainly inconvenient, situations.

The capped bottle opener 46 comprises a plate 52 in which an opening 54 is positioned. A tab 56 extends into the opening 54 and is opposing to a convex edge 58 of the opening 54. The tab 56 is configured to be positioned under a rim 60 of the cap 48, with the convex edge 58 being positioned on a crown 62 of the cap 48. The user is positioned to lever the shell 12 to remove the cap 48 from the capped bottle 50.

As shown in FIG. 3, the capped bottle opener 46 is positioned in a recess 64, which extends into a back 66 of the shell 12. A flap 68 is hingedly attached to the shell 12 and is positioned to selectively cover the recess 64. The present invention anticipates the flap 68 being magnetic so that it magnetically engages the capped bottle opener 46 to retain the flap 68 over the recess 64. The flap 68 also would magnetically engage the cap 48 upon its removal from the capped bottle 50 and thereby facilitate disposal of the cap 48.

In use, the phone 18 is inserted into the shell 12 to couple the shell 12 to the phone 18. When opening of a corked bottle 32 is required, the corkscrew 34 is hinged to the deployed configuration and screwed into the cork 30 of the corked bottle 32. The user then pulls the cork 30 from the corked bottle 32. To open a capped bottle 50, the user simply hinges the flap 68 to expose the capped bottle opener 46, engages the tab 56 and the convex edge 58 to the rim 60 and to the crown 62 of the cap 48, respectively, and then levers the shell 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A bottle opening phone case device comprising:
   a shell defining an interior space, the shell having a front, the front being open, wherein the shell is configured for insertion of a phone for coupling the phone to the shell;
   a plurality of apertures positioned in the shell, such that each aperture aligns with an associated operative element of the phone;
   a corked bottle opener hingedly attached to the shell, such that the corked bottle opener is selectively positionable in a stowed configuration, wherein the corked bottle opener substantially abuts the shell, and a deployed configuration, wherein the corked bottle opener is substantially perpendicular to the shell, wherein the shell is configured for grasping in a hand of a user, positioning the user for using the corked bottle opener for removing a cork from a corked bottle, wherein the corked bottle opener comprises a corkscrew hingedly attached by a first end to the shell, wherein the corkscrew is configured for screwing into the cork of the corked bottle, positioning a user for pulling the cork from the corked bottle; and
   the shell comprising a housing, the housing being attached to a sidewall of the shell and having an open top, the first end of the corkscrew being rotationally attached to and extending between opposed sides of the housing proximate to a respective opposed end of the housing, such that the corkscrew is substantially nested within the housing when in the stowed configuration and hingable from the housing to the deployed configuration.

2. The bottle opening phone case device of claim 1, wherein at least a portion of a sidewall of the shell is resiliently deformable, wherein the sidewall is configured for deforming for facilitating insertion of the phone into the interior space and attachment of the shell to the phone.

3. The bottle opening phone case device of claim 2, wherein the sidewall comprises silicone, rubber, or elastomer.

4. The bottle opening phone case device of claim 1, wherein the opposed ends taper from the open top to the sidewall.

5. The bottle opening phone case device of claim 1, further including a capped bottle opener attached to the shell, wherein the shell is configured for grasping in a hand of a user, positioning the user for engaging the capped bottle opener to a cap on a capped bottle and levering the shell for removing the cap from the capped bottle.

6. The bottle opening phone case device of claim 5, wherein the capped bottle opener comprises:
a plate;
an opening positioned in the plate, the opening having a convex edge; and
a tab extending into the opening and being opposing to the convex edge, wherein the tab is configured for positioning under a rim of the cap with the convex edge being positioned on a crown of the cap, positioning the user for levering the shell for removing the cap from the capped bottle.

7. The bottle opening phone case device of claim 5, further including a recess extending into a back of the shell, the capped bottle opener being positioned in the recess.

8. The bottle opening phone case device of claim 7, further including a flap hingedly attached to the shell, such that the flap is positioned for selectively covering the recess.

9. A bottle opening phone case system comprising;
a corked bottle that is stoppered by a cork;
a phone;
a shell defining an interior space, the shell having a front, the front being open, the phone being positioned in the interior space and coupled to the shell;
a plurality of apertures positioned in the shell, such that each aperture aligns with an associated operative element of the phone; and
a corked bottle opener hingedly attached to the shell, such that the corked bottle opener is selectively positionable in a stowed configuration, wherein the corked bottle opener substantially abuts the shell, and a deployed configuration, the corked bottle opener comprising a corkscrew hingedly attached by a first end to the shell, the corkscrew being screwed into the cork of the corked bottle, such that a user is positioned for pulling the cork from the corked bottle; and
the shell comprising a housing, the housing being attached to a sidewall of the shell and having an open top, the first end of the corkscrew being rotationally attached to and extending between opposed sides of the housing proximate to a respective opposed end of the housing, such that the corkscrew is substantially nested within the housing when in the stowed configuration and hingable from the housing to the deployed configuration.

10. The bottle opening phone case system of claim 9, wherein at least a portion of a sidewall of the shell is resiliently deformable for facilitating insertion of the phone into the interior space and attachment of the shell to the phone.

11. The bottle opening phone case system of claim 10, wherein the sidewall comprises silicone, rubber, or elastomer.

12. The bottle opening phone case system of claim 9, wherein the opposed ends taper from the open top to the sidewall.

13. The bottle opening phone case system of claim 9, further including:
a capped bottle closed with a cap; and
a capped bottle opener attached to the shell, the capped bottle opener comprising:
a plate,
an opening positioned in the plate, the opening having a convex edge, and
a tab extending into the opening and being opposing to the convex edge, the tab being position under a rim of the cap with the convex edge being positioned on a crown of the cap, positioning the user for levering the shell for removing the cap from the capped bottle.

14. The bottle opening phone case system of claim 13, further including:
a recess extending into a back of the shell, the capped bottle opener being positioned in the recess; and
a flap hingedly attached to the shell, such that the flap is positioned for selectively covering the recess.

15. A phone case with integrated bottle opener and corkscrew
a shell defining an interior space, the shell having a front, the front being open, wherein the shell is configured for insertion of a phone for coupling the phone to the shell, at least a portion of a sidewall of the shell being resiliently deformable, wherein the sidewall is configured for deforming for facilitating insertion of the phone into the interior space and attachment of the shell to the phone, the sidewall comprising silicone, rubber, or elastomer;
a plurality of apertures positioned in the shell, such that each aperture aligns with an associated operative element of the phone;
a corked bottle opener hingedly attached to the shell, such that the corked bottle opener is selectively positionable in a stowed configuration, wherein the corked bottle opener substantially abuts the shell, and a deployed configuration, wherein the corked bottle opener is substantially perpendicular to the shell, wherein the shell is configured for grasping in a hand of a user, positioning the user for using the corked bottle opener for removing a cork from a corked bottle, the corked bottle opener comprising a corkscrew hingedly attached by a first end to the shell, wherein the corkscrew is configured for screwing into the cork of the corked bottle, positioning a user for pulling the cork from the corked bottle;
the shell comprising a housing, the housing being attached to the sidewall and having an open top, the first end of the corkscrew being rotationally attached to and extending between opposed sides of the housing proximate to a respective opposed end of the housing, such that the corkscrew is substantially nested within the housing when in the stowed configuration and hingable from the housing to the deployed configuration, the opposed ends tapering from the open top to the sidewall;
a capped bottle opener attached to the shell, wherein the shell is configured for grasping in a hand of a user, positioning the user for engaging the capped bottle opener to a cap on a capped bottle and levering the shell for removing the cap from the capped bottle, the capped bottle opener comprising:
a plate,
an opening positioned in the plate, the opening having a convex edge, and
a tab extending into the opening and being opposing to the convex edge, wherein the tab is configured for positioning under a rim of the cap with the convex edge being positioned on a crown of the cap, positioning the user for levering the shell for removing the cap from the capped bottle;

a recess extending into a back of the shell, the capped bottle opener being positioned in the recess; and a flap hingedly attached to the shell, such that the flap is positioned for selectively covering the recess.

* * * * *